United States Patent [19]
Doddy et al.

[11] Patent Number: 5,572,966
[45] Date of Patent: Nov. 12, 1996

[54] METHOD AND COMPOSITE RESONATOR FOR TUNING AN ENGINE AIR INDUCTION SYSTEM

[75] Inventors: David C. Doddy, Charing Cross; Stephen E. Brackett, Blenheim, both of Canada

[73] Assignee: Siemens Electric Limited, Chatham, Canada

[21] Appl. No.: 315,466

[22] Filed: Sep. 30, 1994

[51] Int. Cl.⁶ ................................................. F02M 35/10
[52] U.S. Cl. ....................................................... 123/184.57
[58] Field of Search ...................... 123/184.57, 184.56, 123/184.52, 184.53, 184.32

[56] References Cited

U.S. PATENT DOCUMENTS 5,002,021  3/1991  Nakata et al. ...................... 123/184.57
5,040,495  8/1991  Harada et al. ...................... 123/184.57
5,107,800  4/1992  Araki et al. ......................... 123/184.57
5,163,387  11/1992  Lee .
5,307,767  5/1994  Schutz ................................ 123/184.57

FOREIGN PATENT DOCUMENTS 1008316  1/1989  Japan ................................. 123/184.57

Primary Examiner—Marguerite McMahon

[57] ABSTRACT

A method and device are disclosed for tuning an air induction system of an internal combustion engine in which an expansion chamber is combined with a Helmholtz resonator tuned to resonate at the engine speed whereat the expansion chamber would otherwise cause an engine torque decline, the combined effects tuning the system over the entire operational range of speeds of the engine.

16 Claims, 1 Drawing Sheet

METHOD AND COMPOSITE RESONATOR FOR TUNING AN ENGINE AIR INDUCTION SYSTEM

FIELD OF THE INVENTION

This invention concerns devices and methods for tuning air induction systems of internal combustion engines.

BACKGROUND OF THE INVENTION

Induction tuning of intake manifolds of internal combustion multicylinder engines has been carried out by various devices. Tuning maximizes air flow by minimizing or counteracting the effects of standing waves and other acoustic phenomena generated in the air induction system.

An expansion chamber resonator is one such device, in which the induction air flow passes into a relatively large volume chamber, and thence into the engine. The expansion chamber prevents the formation of large amplitude standing waves and dissipates the sound energy in the system. However, the use of such resonator chamber devices often still result in a characteristic decline in engine torque at a particular narrow range of engine speeds, since expansion chamber resonators typically are not effective at all noise frequencies.

U.S. Pat. No. 4,539,947 issued on Sep. 10, 1985 for a "Resonator for Internal Combustion Engines" describes a solution for the above problem involving a computer controlled variation of resonator geometry to increase the effective range of the resonator.

Another device is the "Helmholtz" resonator which comprises a chamber which does not receive the induction air flow, but is in communication with the air flow path via a small diameter opening. The resonance of the Helmholtz resonator is limited to a narrow range of engine speeds and thus is not effective over the entire operational range of engine speeds, and hence it has also been proposed to provide an adaptive Helmholtz resonator which is tuned differently over a range of varying engine speeds design.

Such approach, while effective, adds considerable complexity to the device.

It is an object of the present invention to provide engine air induction tuning by completely passive means.

SUMMARY OF THE INVENTION

This object and others, which will become apparent upon a reading of the following specification and claims, are accomplished by a method and a composite resonator, involving the combination of an expansion chamber receiving the induction air flow and a Helmholtz resonator.

The engine speed range at which a torque decline occurs is first determined, and a Helmholtz resonator configuration is designed to be resonant at this particular speed range, whereby the engine torque dip is eliminated.

The Helmholtz resonator is combined integrally with an expansion chamber which attenuates noise, together comprising a single unitary structure.

DETAILED DESCRIPTION

Figure 1:
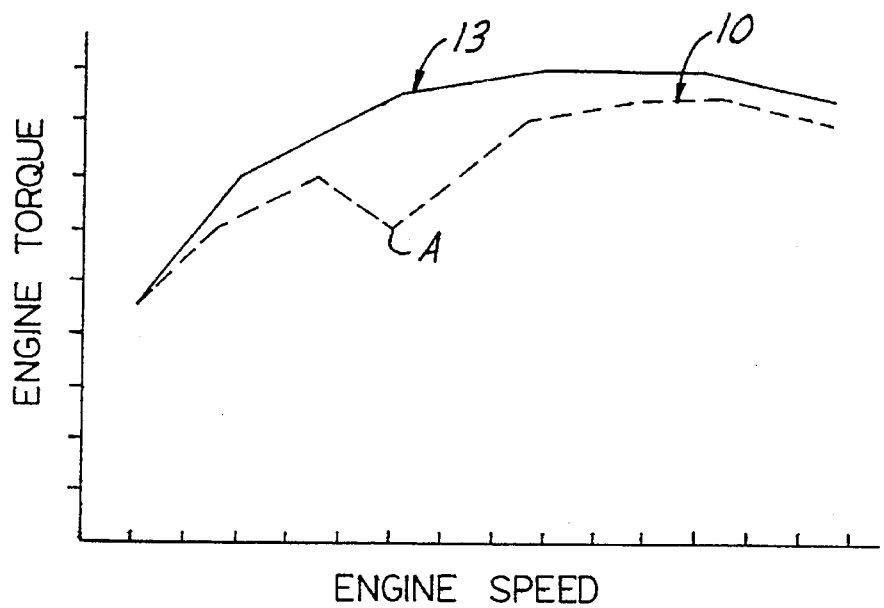
FIG. 1 shows non-dimensional graph plots of engine torque versus engine speed for an engine with and without a composite resonator according to the invention.

FIG. 1 shows a graph plot 10 produced by operation of a multicylinder engine lacking the present invention through a range of engine speeds. At a particular narrow range of engine speed, there is a characteristic drop "A" in engine torque. This drop is caused by a pressure pulse traveling out of the induction passage and not reflecting back to reinforce the pressure at an engine intake valve at a particular engine speed. The engine torque output corresponds to this air pressure, and hence the described condition results in a drop in engine torque.

Figure 2:
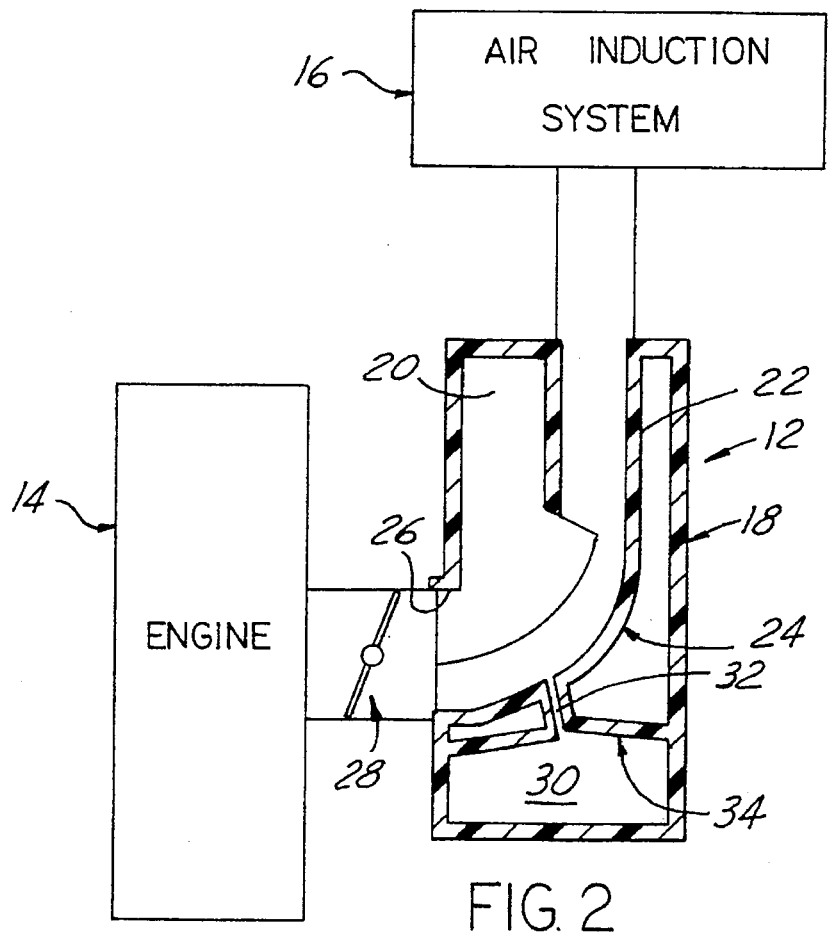
FIG. 2 is a sectional view through a composite resonator according to the invention with a diagrammatic representation of the engine and air intake system.

FIG. 2, shows a composite resonator 12 according to the present invention connected between an engine 14 and components of an air induction system upstream of the resonator, collectively identified by block 16.

The composite resonator 12 includes a housing 18 defining an expansion chamber 20 receiving air flow via an inlet tube 22 extending into the chamber 20.

A deflector baffle 24 extending from the inner end of tube 22 directs the air flow to an outlet port 26 and on to an engine throttle valve 28.

The various dimensional parameters of the inlet tube 22 and volume of the chamber 20 determine the most effective noise attenuating frequency range of the device, as known to those skilled in the art.

The housing 18 also defines a Helmholtz resonator defined by a chamber 30 closed off to the intake air flow by a partition 34, but in communication with expansion chamber 20 via a short length passage 32, or port, extending from chamber 30 through the deflector baffle 24 and opening to the expansion chamber 20. One side of deflector baffle 24 comprises a curved surface 35 extending from an inner wall surface 37 of tube 22 to outlet port 26, and as is apparent from FIG. 2, surface 35 has a 90 degree longitudinal extent and is concave in both longitudinal and transverse cross sections.

A Helmholtz resonator will resonate at a particular frequency range determined by its various dimensional parameters, i.e., the volume of chamber 30 and the length and cross sectional area of passage 32, as is well known to those skilled in the art.

According to principles of the present invention, the Helmholtz resonator is designed to be effective at the frequency range corresponding to the engine speed range at which occurs the torque decline A occurs as represented in FIG. 1, to create a resonance which produces a pressure wave increasing air flow to the engine 14 in that speed range.

The dip in engine torque versus engine speed graph plot is thus eliminated, as seen by the plot 13 representing engine torque produced when the air intake system contains a composite resonator of the present invention.

The housing 18 is preferably formed so that the expansion chamber 20, deflector baffle 24, chamber 30, etc., are an integral, unitary structure. This can advantageously be accomplished by molding the part in two halves, which are then friction-welded together. As shown in FIG. 2, partition 34 is an internal wall of housing 18 which is shared by chambers 20, 30, separating them from each other.

We claim:

1. A composite air induction tuning device, in combination with an internal combustion engine having a combustion air intake system, and comprising:

a housing defining an expansion chamber;

an inlet via which combustion air enters the expansion chamber and an outlet via which combustion air exits the expansion chamber for passage to the engine;

a Helmholtz resonator also defined by said housing and comprising a port via which the Helmholtz resonator is placed in communication with the expansion chamber;

the expansion chamber having a construction coacting with the engine wherein an engine torque vs. engine speed plot comprises a dip in torque over a particular portion of a range of engine operating speeds;

said Helmholtz resonator having a construction providing resonance at the particular portion of the engine speed range to counteract the dip in engine torque; the device further including a curved deflector baffle disposed in said expansion chamber and having a curved surface for directing air flow that has entered the expansion chamber towards said outlet, said outlet extending in a transverse direction from said inlet, and wherein said Helmholtz resonator comprises a Helmholtz chamber located on a side of said deflector baffle adjacent the curved surface of the deflector baffle and said port extends from the Helmholtz resonator chamber through said deflector baffle and into communication with said expansion chamber.

2. An internal combustion engine air intake system comprising:

an entrance at which combustion air enters the system;

an exit from which combustion air exits the system to pass to an engine;

an expansion chamber resonator comprising an enclosure defining an expansion chamber having an inlet at which combustion air that has entered the system at the system inlet enters the expansion chamber and an outlet at which combustion air that has entered the expansion chamber passes from the expansion chamber to the system exit, and thence to an engine;

a member comprising a concave surface that is disposed internally of the expansion chamber and directs combustion air flow through the expansion chamber; and a Helmholtz resonator comprising a Helmholtz chamber and a Helmholtz port that opens to the expansion chamber at the concave surface of the member to place the Helmholtz chamber in communication with the expansion chamber.

3. An internal combustion engine air intake system as set forth in claim 2 wherein the concave surface of the member is concave in both longitudinal and transverse cross sections.

4. An internal combustion engine air intake system as set forth in claim 3 wherein the member comprising the concave surface is an extension from a tube that forms the expansion chamber inlet.

5. An internal combustion engine air intake system as set forth in claim 2 wherein the expansion chamber and the Helmholtz chamber share a common wall separating the two chambers.

6. An internal combustion engine air intake system as set forth in claim 5 wherein the Helmholtz port opens to the Helmholtz chamber at the common wall.

7. An internal combustion engine air intake system as set forth in claim 2 wherein the concave surface of the member has a lengthwise curvature of 90 degrees between the expansion chamber inlet and outlet.

8. An internal combustion engine air intake system comprising:

an entrance at which combustion air enters the system;

an exit from which combustion air exits the system to pass to an engine;

a composite resonator comprising an enclosure defining both an expansion chamber resonator having an expansion chamber and a Helmholtz resonator having a Helmholtz chamber;

the enclosure comprising a common internal wall separating the two chambers from each other;

an inlet at which combustion air that has entered the system at the system inlet enters the expansion chamber and an outlet at which combustion air that has entered the expansion chamber passes from the expansion chamber to the system exit, and thence to an engine;

a member comprising a deflection surface that is disposed internally of the expansion chamber and directs combustion air flow through the expansion chamber; and the Helmholtz resonator comprising a Helmholtz port that opens to the expansion chamber at the deflection surface of the member to place the Helmholtz chamber in communication with the expansion chamber.

9. An internal combustion engine air intake system as set forth in claim 8 wherein the deflection surface is concave.

10. An internal combustion engine air intake system as set forth in claim 9 wherein the deflection surface is concave in both longitudinal and transverse cross sections.

11. An internal combustion engine air intake system as set forth in claim 9 wherein the member comprising the concave deflection surface is an extension from a tube that forms the expansion chamber inlet.

12. An internal combustion engine air intake system as set forth in claim 8 wherein the Helmholtz port opens to the Helmholtz chamber at the common wall.

13. An internal combustion engine air intake system as set forth in claim 8 wherein the deflection surface of the member has a lengthwise curvature of 90 degrees between the expansion chamber inlet and outlet.

14. An internal combustion engine air intake system as set forth in claim 13 wherein the deflection surface is concave in transverse cross section.

15. A method of tuning a combustion air intake system of an internal combustion engine wherein an expansion chamber resonator, comprising an expansion chamber, forms a portion of the intake system and coacts with the engine such that an engine torque vs. engine speed plot comprises a dip in torque over a particular portion of a range of engine operating speeds, the method of tuning comprising the steps of:

operating the engine to determine the particular portion of the range of engine operating speeds where a dip in torque occurs; and placing a Helmholtz resonator directly in communication with the expansion chamber to resonate at the particular portion of the engine speed range that contains the dip determined by the operating step and thereby counteract the dip, wherein the Helmholtz resonator is placed in communication with the expansion chamber via a Helmholtz port that opens to the expansion chamber at an interal deflection surface that is disposed internally of the expansion chamber and directs combustion air flow through the expansion chamber.

16. An internal combustion engine air intake system comprising:

an entrance at which combustion air enters the system;

an exit from which combustion air exits the system to pass to an engine;

a composite resonator comprising an expansion chamber resonator and a Helmholtz resonator;

the expansion chamber resonator comprising an enclosure defining an expansion chamber having an inlet at which combustion air that has entered the system at the system inlet enters the expansion chamber and an outlet at which combustion air that has entered the expansion chamber passes from the expansion chamber to the system exit, and thence to an engine; and the Helmholtz resonator comprising a Helmholtz chamber and a Helmholtz port that opens directly to the expansion chamber to place the Helmholtz chamber directly in communication with the expansion chamber, wherein the Helmholtz port opens to the expansion chamber at an internal deflection surface that is disposed internally of the expansion chamber and directs combustion air flow through the expansion chamber.

* * * * *